(12) United States Patent
Doepke et al.

(10) Patent No.: US 8,205,154 B2
(45) Date of Patent: Jun. 19, 2012

(54) USER DEFINABLE TRANSITION TOOL

(75) Inventors: Frank Doepke, Cupertino, CA (US); Douglas DeVore, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 576 days.

(21) Appl. No.: 10/826,415

(22) Filed: Apr. 16, 2004

(65) Prior Publication Data

US 2005/0231511 A1 Oct. 20, 2005

(51) Int. Cl.
*G06F 17/00* (2006.01)
(52) U.S. Cl. ......................... 715/255; 715/201; 715/202
(58) Field of Classification Search .............. 715/501.1, 715/201, 255, 202; 725/86, 47
See application file for complete search history.

(56) References Cited

U.S. PATENT DOCUMENTS

| | | | | |
|---|---|---|---|---|
| 5,353,391 A * | 10/1994 | Cohen et al. | .................. | 345/619 |
| 5,404,316 A * | 4/1995 | Klingler et al. | ................ | 715/723 |
| 5,528,310 A * | 6/1996 | Peters et al. | .................. | 348/593 |
| 5,726,717 A * | 3/1998 | Peters et al. | .................. | 348/593 |
| 6,031,529 A * | 2/2000 | Migos et al. | ................... | 715/783 |
| 6,154,600 A * | 11/2000 | Newman et al. | ................... | 386/4 |
| 6,415,303 B1 * | 7/2002 | Meier et al. | ................ | 715/500.1 |
| 6,445,816 B1 * | 9/2002 | Pettigrew | ...................... | 382/162 |
| 6,496,599 B1 * | 12/2002 | Pettigrew | ...................... | 382/162 |
| 6,909,438 B1 * | 6/2005 | White et al. | ................... | 345/629 |
| 2002/0092019 A1 * | 7/2002 | Marcus | ........................... | 725/37 |
| 2002/0116716 A1 * | 8/2002 | Sideman | ......................... | 725/91 |
| 2003/0184556 A1 * | 10/2003 | Hollis et al. | .................. | 345/582 |
| 2004/0012607 A1 * | 1/2004 | Witt | ................. | 345/592 |
| 2004/0131330 A1 * | 7/2004 | Wilkins et al. | ................. | 386/55 |
| 2004/0218894 A1 * | 11/2004 | Harville et al. | ................ | 386/46 |
| 2004/0268413 A1 * | 12/2004 | Reid et al. | ..................... | 725/131 |
| 2005/0207734 A1 * | 9/2005 | Howell et al. | .................. | 386/68 |
| 2005/0268279 A1 * | 12/2005 | Paulsen et al. | ................ | 717/110 |
| 2006/0056728 A1 * | 3/2006 | Silverbrook et al. | ......... | 382/276 |

OTHER PUBLICATIONS

Truong, Ba Tu, et al., "New Enhancements to cut, fade, dissolve detection processes in video segmentation", Proceedings of the eighth ACM international conference on Multimedia, pp. 219-227, Published 2000.*
McFedries, Paul, "Complete Idiot's Guide to Windows XP", Chapter 12 "Creating Movies with Windows Movie Maker", pp. 1-10, Pub Date: Oct. 3, 2001.*
Chominsky, "Premiere 6.5 Fundamentals", published Jan. 2003, pp. 1-56, retrieved from Safari Books online, http://academic.safaribooksonline.com.*
"Final Cut Pro 4 Specification Sheet", copyright 2003 Apple Computer, Inc., p. 1-7.*
QUICKTIME, MakeEffectsMovie, HTTP://developer.apple.com/quicktime/quicktimeintro/tools/makeeffectmovi... Apr. 9, 2004.
Inside Macintosh: QuickTime Reference "Working with Alpha Channels" http://developer.apple.com/documentation/QuickTime/Ref/refImageCompMgr.7... Apr. 8, 2004.

* cited by examiner

*Primary Examiner* — Amelia Rutledge
(74) *Attorney, Agent, or Firm* — Wong, Cabello, Lutsch, Rutherford & Brucculeri, L.L.P.

(57) ABSTRACT

Techniques (methods and devices) that permit a user to define multimedia transitions in terms of user-supplied assets are described. The user supplies the assets necessary to generate the transition such as, for example, an asset movie, an asset matte movie and a background matte movie. (The specific assets required may vary depending upon the transition to be generated.) These assets are then automatically combined (e.g., through compositing) to render a completed multimedia object in which the defined transition is used to visually transition a first image or frame to a second image or frame. The same techniques used in some generic transformation of images or movies are also disclosed.

22 Claims, 4 Drawing Sheets

USER DEFINABLE TRANSITION TOOL

BACKGROUND

The invention relates generally to video or image editing software and, more particularly, to a means for automatically assembling a user-specified video transition.

Historically editing of video images has been limited to professional production companies using extremely expensive equipment. This was in part because the computational power necessary to edit video images was prohibitively expensive for the consumer market. Because the market for video editing equipment, e.g., video editing software, has been comprised almost entirely of professionals, it has historically been very complicated.

Innovations in the field of personal computer design have resulted in reduced costs and improved computational power of consumer-grade systems. In addition, advances in digital video technology have resulted in the wide-spread availability of high quality digital video cameras for the consumer market. The result of this combination is that professional-grade video editing capability is now available to the average consumer.

One common video editing task is to visually move from a first scene to a second scene. To blend or smooth the transition from the first scene to the second scene, many video editing software applications provide what are known as "transitions." Transitions are visual effects which permit a user to visually move from the first scene to the second scene in a coherent and acceptable manner. For example, one common transition is the "fade" transition in which a first frame is gradually faded out and a second frame is gradually faded in. The first and second frames may come from the same video stream or movie or from different video streams or movies. Transitions may be used to visually move or transition between any two (or more) media: video, still images, multimedia, DVD menus, presentations, etc. Smooth transitions make the resulting movie look more professional. The types of transitions available in current video editing software applications, however, are limited to built-in or pre-defined transitions. That is, the user cannot define his or her own transition styles or techniques.

Another common video editing task is to set effects. A user may want to change the way a video clip is replayed, for example, combining two or more video clips into one movie or animating portions of the images. The task of setting effects is typically complicated and requires several separate dedicated applications. In addition, the choice of which effects to use may be limited by the video clips or other multimedia assets available within the application program.

Thus, it would be beneficial to provide video editing software and/or video editing systems that permit a user to define his or her own transitions in terms of a collection of video assets (e.g., video streams/movies or still images) and other files or media that are automatically assembled into a cohesive transition.

SUMMARY

In one embodiment, the invention provides a method that permits a user to define their own multimedia transition, automatically assembling user-identified assets into a complete and cohesive transition effect. The method includes identifying a plurality of multimedia assets that collectively define a transition, identifying a source multimedia object, identifying a target multimedia object, and automatically compositing the identified multimedia assets with the source and target multimedia objects to create the transition effect.

Methods in accordance with the invention may be stored in any media that is readable and executable by a computer system. In addition, methods in accordance with the invention may be stored in, and made part of, a computer system that enables a user to define and create their own multimedia transitions. Multimedia assets suitable for defining a transition effect in accordance with the invention include, but are not limited to, video streams (with or without alpha channels), matte movies, background matte movies, switch points and durations. These assets (embodied in computer files) may come from any source and be located anywhere that is accessible to the user. Techniques (methods and devices) in accordance with the invention may be used to define customized transitions for video streams, menus, tracks or clip concatenations, slideshows and the like.

DETAILED DESCRIPTION

Figure 1:
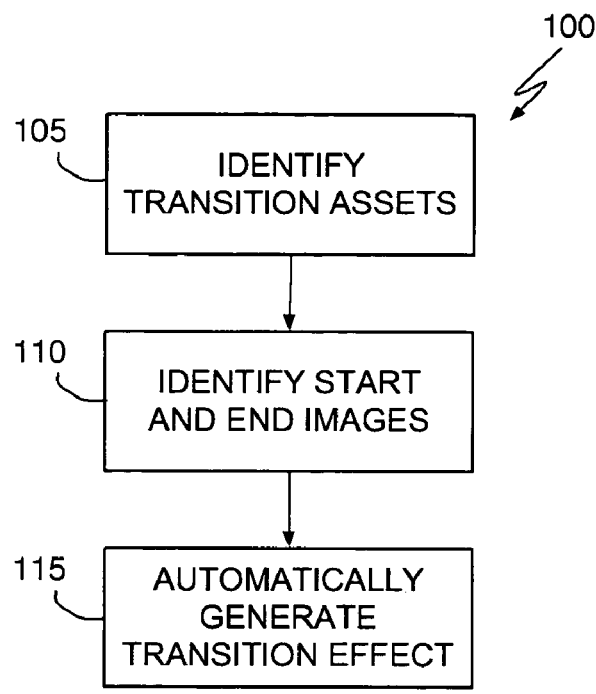
FIG. 1 shows, in block diagram form, a method in accordance with one embodiment of the invention.

Techniques (including methods and devices) that permit a user to supply transition assets and then automatically generate multimedia transition effects are described. The following embodiments of the invention, described in terms of an alpha-type video transition, are illustrative only and are not to be considered limiting in any respect.

The following description is presented to enable any person skilled in the art to make and use the invention as claimed and is provided in the context of the particular examples discussed below, variations of which will be readily apparent to those skilled in the art. Accordingly, the appended claims are not intended to be limited by the disclosed embodiments, but are to be accorded their widest scope consistent with the principles and features disclosed herein.

For simplicity, the terms defined below will be used in describing the illustrative user-defined transition method:

Alpha channel: Part of an image that describes its transparency. In computer graphics, a portion of each pixel's data that is reserved for transparency information is referred to as the "alpha channel." For example, typical 32-bit graphics systems contain four channels—three 8-bit channels for red, green, and blue (RGB) and one 8-bit alpha channel. Thus, an alpha channel is a mask that specifies how a pixel's colors should be merged or blended with another pixel when the two are overlaid, one on top of the other.

Alpha transition: A transition from a first (i.e., source or start) image or clip to a second (i.e., target or end) image or clip using transparency techniques. Each pixel in the resulting image is a blend of the corresponding pixels in the foreground image and the background image according to the corresponding pixel in the alpha channel. Alpha transitions are also known as "track matte transitions."

Asset movie: The movie or image shown during the transition from a designated start image or clip to a designated end image or clip. An asset movie is required if the user wants to display any image other than the start and end images. The asset movie may have an embedded alpha channel or the asset movie's transparency information may be provided by a separate asset matte movie.

Asset matte movie: A movie that provides transparency information associated with the asset movie. Asset matte movies are typically represented in grayscale (if color information is provided, it is ignored).

Background matte movie: A grayscale movie, where the white portion identifies where the start image should appear during the transition and the black portion identifies where the end image should appear during the transition. A background matte movie is required if the start and end images (in whole or in part) are to be shown at the same time.

Switch Points: If the start and end images do not have to be displayed at the same time, a switch point may be used to identify the time when the start image is replaced by the end image. Switch points may be implemented as a marker in the asset movie—indicating, for example, when a first (start) frame in the asset movie is replaced with a second (end) frame in the asset movie.

Transition: A process that visually takes the viewer from a first or start image/clip to a second or end image/clip. Illustrative transitions include, but are not limited to, alpha transitions, wipe transitions, fade transitions and displacement map transitions.

Transformation: Transformation is a generic term for a process where a background image is blended with a foreground image (also known as an asset image) according a blending parameter. The blending parameter may be pixel specific information in a matte image. The blending parameter may also be a single parameter that applies uniformly to all pixels in the foreground and background images. The image resulting from the blending of the foreground and background images may be referred to as the transformed image. The term transformation may also be applied to movies (sequential collections of still images). When one says a movie is transformed, it means that each corresponding frame in the movies (e.g., a first movie, a second or asset movie and a third or matte movie) undergo a transformation to produce a transformed frame. The collection of all such transformed frames is the transformed movie. Illustrative transformations include alpha transitions, displacement map transitions, filtering and zooming.

Transition asset folder: A folder or directory designated to contain the assets (e.g., images and/or movies) that collectively define the transition. While a transition asset folder is not required by the inventive technique, it has been found beneficial for managing actual implementations.

Transition Duration: The time interval during which a transition is effected.

X-asset key: A collection of all assets for a transformation including movies and parameters. An x-asset key may include, but is not limited to, an asset-movie, an asset matte movie, a background matte movie, a scale map movie, a displacement map movie, a luminosity map movie, a zoom-x map movie and a zoom-y map movie. An x-asset key may also include independent parameters that affect the transformed movies including, but are not limited to, switch points, durations and markers. All assets (e.g., movies or parameters) within the x-asset key may be located in one location, such as a designated file directory or folder in a computer system or they may be physically distributed across a networked computer system. In practice, the x-asset key may be embodied in a file with indictors (e.g., file paths) that identify the locations of the assets.

Referring now to FIG. 1, method 100 for defining and automatically generating arbitrary transitions in accordance with the invention is shown in flowchart form. Initially a user identifies all those assets needed to implement the desired transition (block 105). In accordance with the invention, at least one of the assets so identified is user-supplied. For example, if the transition requires an image other than the start or end image to be displayed, an asset movie is needed—such movie could be generated and supplied by the user. That is, the user is not restricted to predefined transition images, movies, or effects. If the asset movie does not incorporate transparency information (i.e., an alpha channel) or if a different transparency treatment than that intrinsically encoded in the asset movie's alpha channel is desired, an asset background matte may also be required. In addition, if both the start image and the end image are to be displayed at the same time (at any point during the transition) a background matte movie is required. If the start and end images are not to be displayed at the same time during the transition, a switch point may be specified or a default switch point may be used. Finally, a duration for the transition may be selected by the user or determined based on characteristics of the identified assets (e.g., the asset movie or the asset matte movie).

Next, the user identifies the start and end images or frames the transition is to transition between (block 110). In one embodiment, the start and end images may be different frames in a single video stream or clip. In another embodiment, the start and end images may be different images in a slide show. In yet another embodiment, the start and end images may be different menus. In still another embodiment, the start and end images may be images from different video clips. One of ordinary skill in the art will recognize that combinations of these different start and end images are also possible.

With this information, methods in accordance with the invention generate the desired transition (block 110). In one embodiment, a compositing engine may be used to composite the asset movie (if present), the asset matte movie (if present) and the background matte movie (if present) into a final movie incorporating the start frame or image, the end frame or image, and the desired transition between the start and end frames. One of ordinary skill in the art will recognize that not all transitions require a start and end image. For example, a displacement transition transforms a single start image into an end image. In transitions such as this, no "end image" need be identified or supplied by the user.

Figure 2:
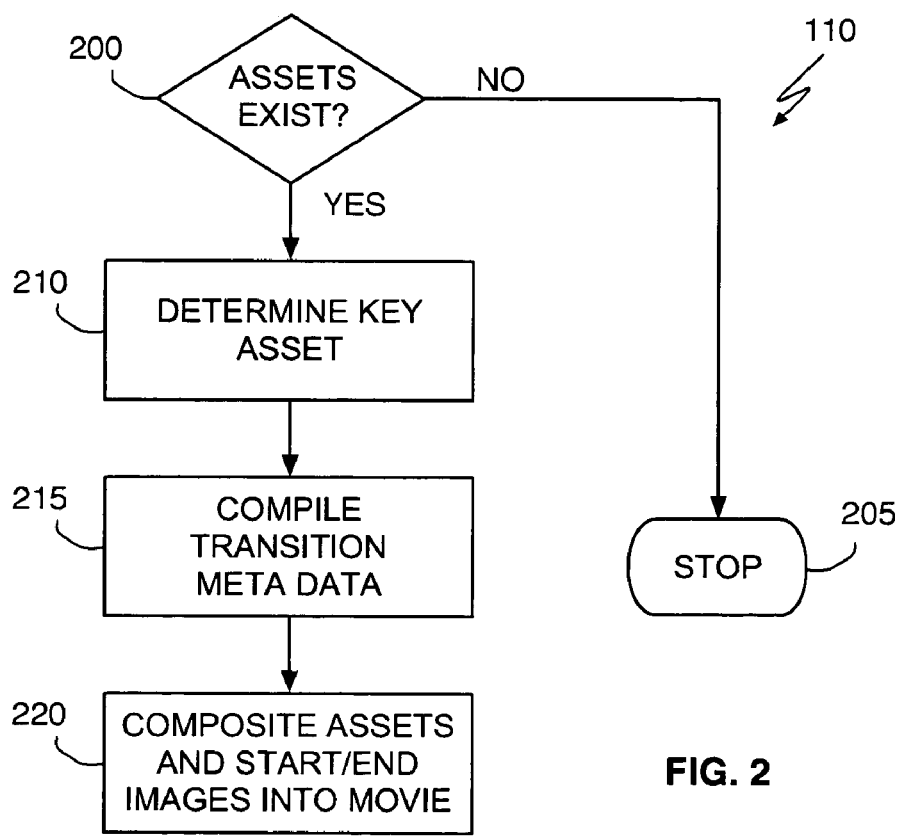
FIG. 2 shows, in block diagram form, some details of the embodiment of FIG. 1.

Referring now to FIG. 2, additional details of the invention's act of generating the desired transition (block 110) are illustrated. As an initial step, methods in accordance with the invention determine if the required assets exist (diamond 200). The exact list of required assets will vary depending upon the type of asset. For example, an alpha transition requires a start image, an end image, and one or more of the following: an asset movie, an asset matte movie and a background matte movie. For a displacement transition, a state frame and one or more of the following: an asset movie, an asset matte movie and a background matte movie are required. Those of ordinary skill in the art will recognize that other transitions (e.g., cross fade, explode, gradient, implode, iris, matrix and push) have their own "required" assets.

In one embodiment, the required assets may be stored in a predetermined directory. In another embodiment, the user may be queried for the location of each needed asset. In yet another embodiment, the location of each required asset may be provided through a file wherein the location of each asset is given in the file. If the required assets do not exist (the "No" prong of diamond 200), automated transition generation stops (block 205). If the required assets do exist (the "Yes" prong of diamond 200), one asset from among the plurality of assets identified in accordance with the acts of diamond 200 is identified as the "key asset" (block 210). The key asset is that asset which is used to define the time duration of the transition. In one embodiment, the key asset is also used to determine the video format of the resulting transition.

Having identified the transition assets in general (block 200) and the key asset in particular (block 210), transition metadata is compiled to facilitate the automated generation of the transition (block 215). In one embodiment, transition metadata is represented by a series of key-value pairs. Such key-value pairs may be stored in an ASCII file, a database or in any other format desired by the user. Illustrative key-value pairs are shown in Table 1.

TABLE 1

Illustrative Key-Value Pairs

| Key | Value |
| --- | --- |
| asset_name | directory path of location in which transition assets are stored |
| asset_matte | directory path of location in which transition's asset matte is stored |
| background_matte | directory path of location in which transition's background matte is stored |
| duration | time value (in seconds) |
| switch_point | value between 0.0 and 1.0 representing the time in the asset movie at which the transition is to occur (0 means at the start; 1 means at the end) |
| name | string |

With the metadata compiled in accordance with block 215, a composite engine may be used to combine the identified start and end frames with the identified transition assets to create a single output file in which the start image is transitioned to the end image in accordance with the user-supplied transition assets (block 220).

Figure 3:
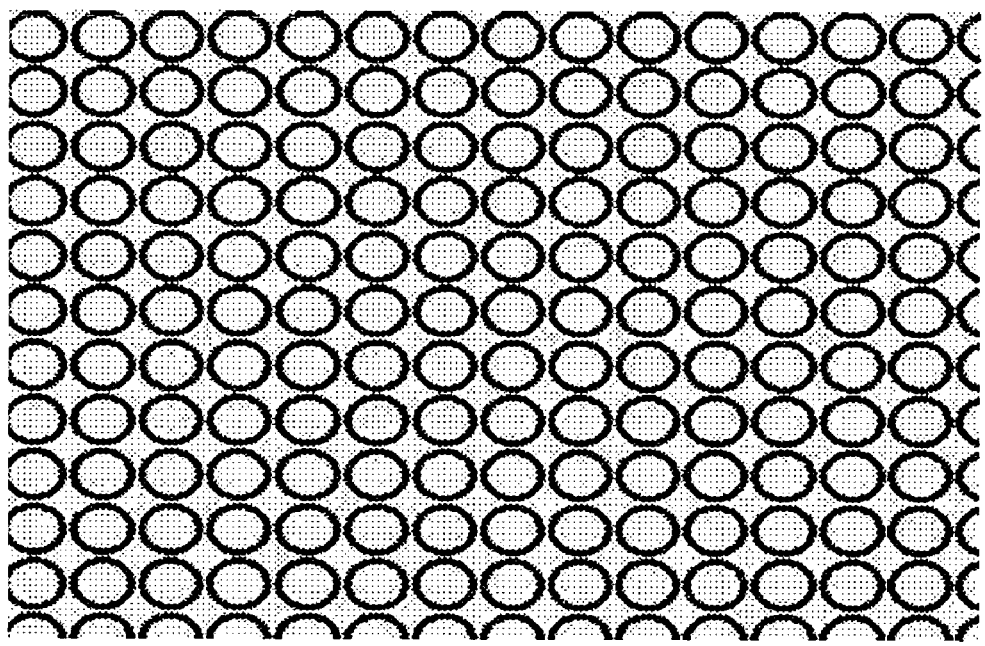
FIG. 3 illustrates the last frame of a first video clip (a screen full of oval rings), also known as source or start frame.
Figure 4:
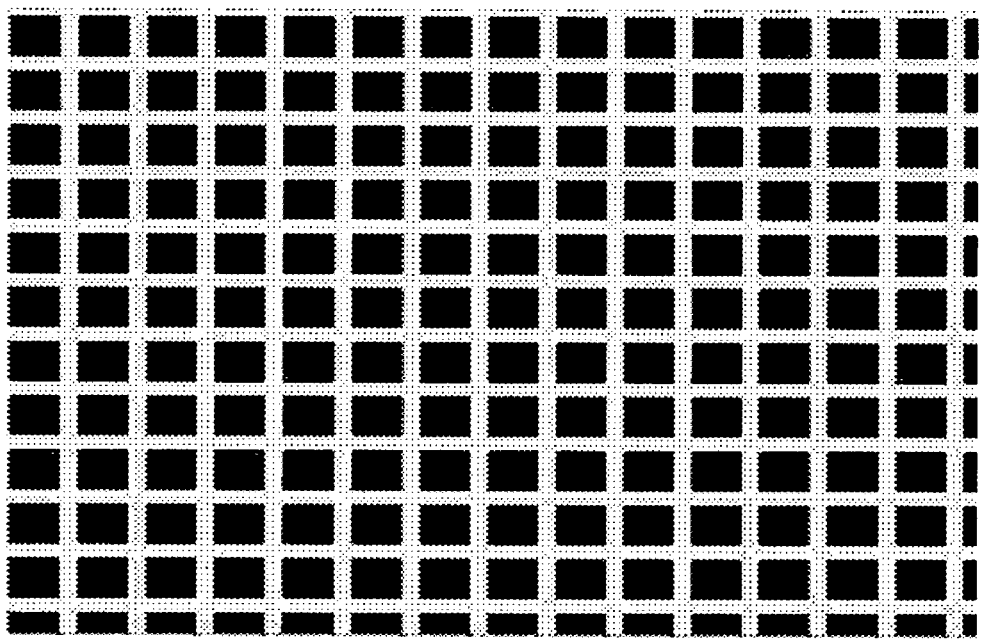
FIG. 4 illustrates the first frame of a second video clip (a screen with straight lines), also know as the target or end frame.
Figure 5:
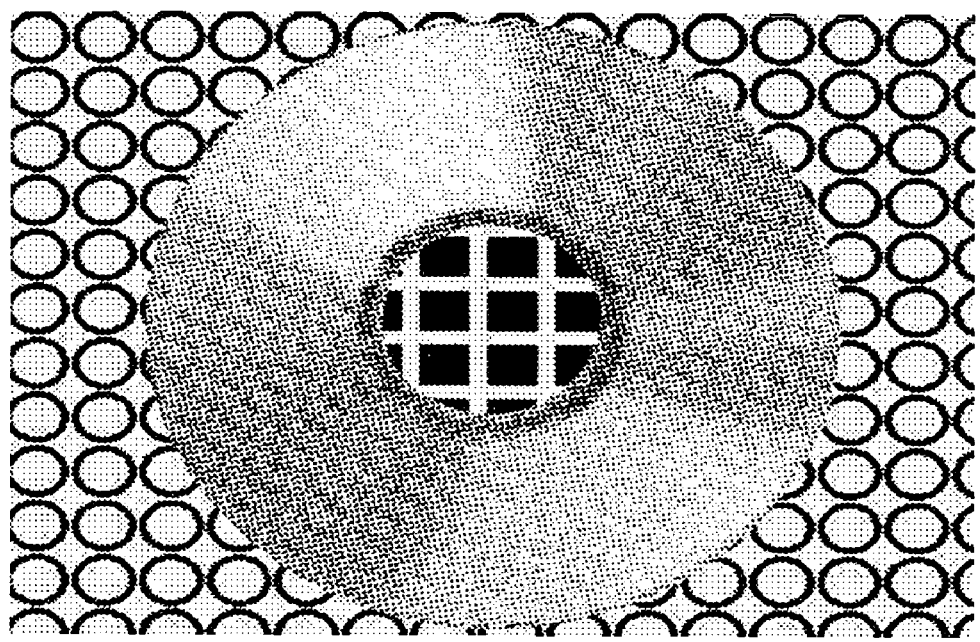
FIG. 5 illustrates a frame during a transition from the image of FIG. 3 to the image of FIG. 4, wherein the oval rings of FIG. 3 are disappearing within the flying DVD (see FIG. 6) and the straight lines of FIG. 4 are appearing from within the center of the DVD.
Figure 6:
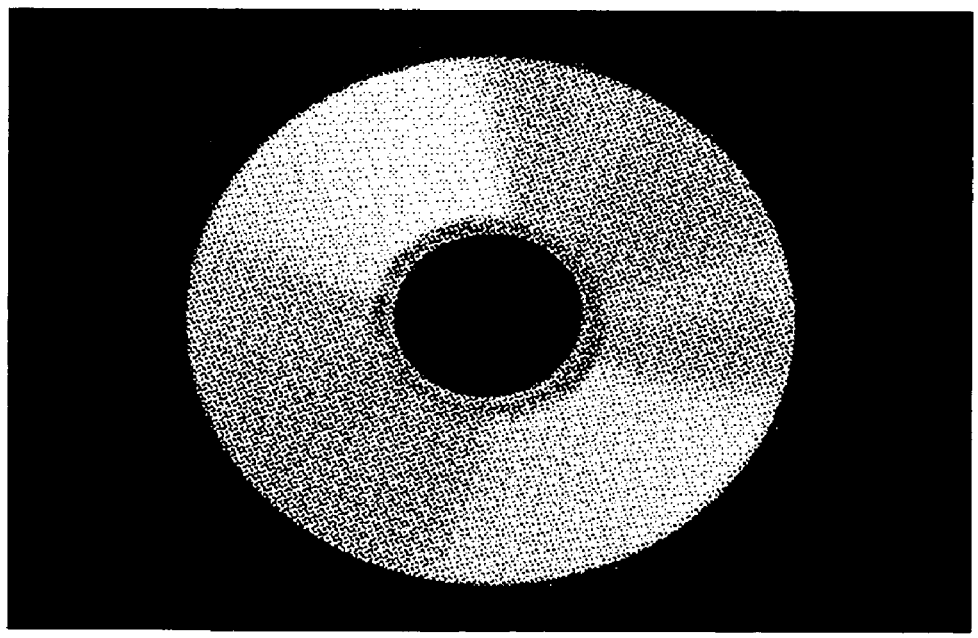
FIG. 6 illustrate a frame (of a flying or rotating DVD) in an asset movie.

By way of illustration only, the following discussion describes an embodiment of the invention as applied to an alpha transition. It will be recognized that the inventive technique may be applied to any video or still image transition, filter or special effect in a similar way. For simplicity, the illustrative alpha transition is described in terms of a start image or frame (an image of oval rings, see FIG. 3) being transitioned into an end image or frame (an image of straight lines, see FIG. 2) via a flying/rotating DVD image (see FIG. 4). A frame during the transition is shown in FIG. 3, where the flying DVD image overlaps the start and end images. The start image (the rings) is disappearing and the end image (the straight lines) is emerging from the center of the flying DVD image.

The asset movie may be any movie or image that a user has and wants to be shown during the transition from the start frame to the end frame. Unlike the asset movies available in prior art video editing applications, which are limited to the movies or clips preinstalled within the video editing program, asset movies in accordance with the invention may be any movie. It may be created by the user or copied from other sources. It is not limited to any particular format. It may be modified by the user any way the user desires. Therefore, the user has complete control and freedom to customize the asset movie. This control of the asset movie is not available in prior art video editing applications.

Figure 7:
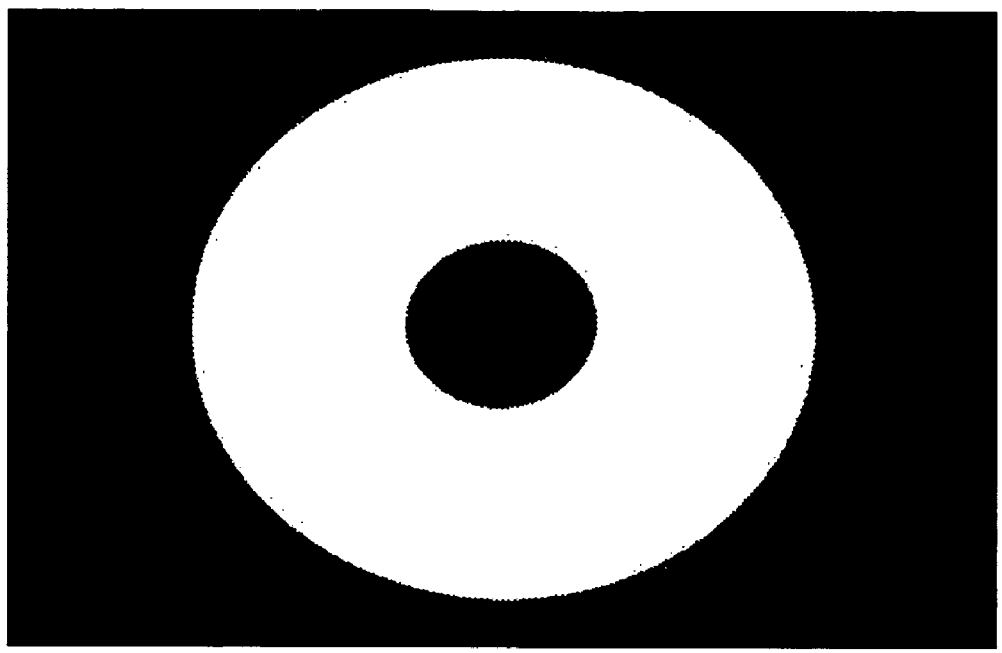
FIG. 7 illustrates a frame in an asset matte movie.
Figure 8:
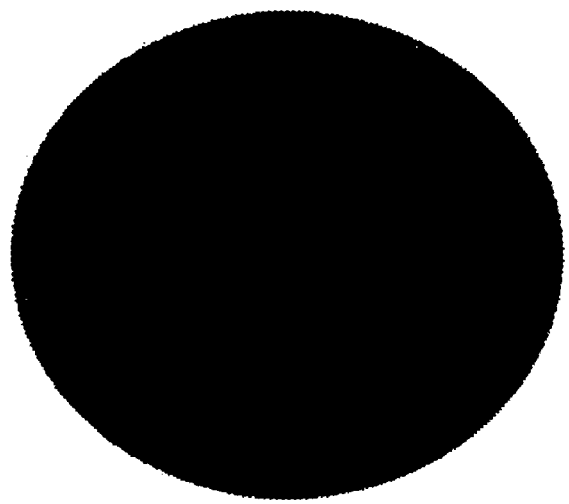
FIG. 8 illustrates a frame in a background matte movie.

Similarly, the user also has complete control of the asset matte and background matte movies. In the current example, an asset matte movie is shown in FIG. 7 and a background matte movie is shown in FIG. 8.

Once all three movies (asset movie, asset matte movie and background matte movie) are identified and made available, the video editing application can automatically combine them according to common alpha transition methodologies to create a customized transition movie. This transition movie may be used directly within the video editing application or stored for future use. All the assets identified will also be saved, and may be used for another transition, with different start/end frames, or for transitioning different video clips.

Not all alpha transitions need to have all three movies. Different movies or parameters may also be identified and used in some alpha transitions. For example, some asset movies may contain an alpha channel. A user may choose to use the embedded alpha channel in the asset movie, in which case an asset matte movie is not needed. With a separate asset matte movie, the user has more control on how the asset movie is blended with the start frame and/or the end frame. In general, only a monochrome movie is necessary for an asset matte movie. The brightness of each pixel (luma) is used to determine how to blend the start/end frame (background) with the asset movie (foreground). Any color information (chroma) in the asset matte movie is ignored, if present.

The asset and asset matte movies address how to blend the start frame/end frame as a background with the asset movie as a foreground. They do not address whether the start frame and the end frame should be present in a screen at the same time. A background matte movie may be used to control this aspect of the transition. The background matte movie is a grayscale movie, where the white portion indicates those areas in which the start frame should show (blocking view of the end frame), and where the black portion indicates those areas in which the end frame should show (blocking the start frame). As an example, FIG. 8 shows a frame of a background matte movie. (For convenience, only a black and white image is shown. The invention is not so limited.) In the illustrative alpha transition example, the background matte movie starts with full white screen, i.e. showing all of the start frame and none of the end frame. Gradually, the area of the white portion decreases while the area of the black portion increases, i.e., showing less of the start frame and more of the end frame. Finally, the whole screen is black, i.e., only the end frame is shown.

Since the asset movie, the asset matte movie and the background matte movie are three independent movies, possibly from different sources, they may have different durations, different sizes (i.e., number of pixels), etc. Before they may be used in an alpha transition, they will be adjusted to have a uniform length (in time and in number of frames) and a uniform size (in pixels). Because the acts of enlarging or shrinking the size of a digital image and the lengthening or shortening of a movie's play time are well known in the art, these acts will not be discussed in detail here. Typically, the asset movie controls the length, size and other formatting parameters, but the user may choose to do otherwise. For example, the user may choose to adjust the movies format, the size and length to conform to the background matte movie.

As indicated above, not all movies are necessary. A "switch point," an independent parameter, in lieu of the background matte movie may also be used in an alpha transition. In this scenario, only one of the start frame and the end frame is shown at any given time—they are not displayed at the same time. Before the switch point, only the start frame is shown and after the switch point, only the end frame is shown. The switch point may be embedded in the asset movie as a "marker." If a marker is not embedded in the asset movie, a default value for the switch point may be assumed. For example, the midway point (in time) of the transition. Alternatively, the user may specify a switch point.

The duration of the transition is typically determined by the length of the asset movie as discussed above. But a user may use an independent "duration" parameter to shorten or lengthen the actual transition. In one embodiment, the duration of a transition is permitted to vary between approximately one-half the duration of the asset movie to twice the duration of the asset movie.

In one embodiment of the invention, the user may use an x-asset key to identify the location of each asset required for a transition and, in addition, other parameters needed or desired for the transition. (See definition above for "x-asset key.") In one embodiment, an x-asset key is implemented as an ASCII file, wherein the file identifies the "path" to each asset required by the target transition (e.g., an alpha transition) along with, perhaps, other transition parameters such as the desired name of the transition and its duration. As noted above, x-asset keys permit a user to "define" a transition in terms of assets that may be distributed throughout a computer network or, more simply, through multiple directories on a single workstation.

In another embodiment, the following file structure and naming convention may be followed to better manage the various assets used in a transition:

(1) All user-defined assets are stored in subfolders to the "asset transition folder," For example, /Transitions/;
(2) Assets for each user-defined transition are stored in a folder whose name is that of the transition, for example, all assets associated with a user-defined transition named "ABC" are stored in a folder named "ABC" inside the asset transition folder. For example, /Transitions/Spin DVD, where "Spin DVD" is the name of the transition;
(3) The asset movie, if present, has the same name as the transition and may have an optional suffix (e.g., ABC-.mov). For example, /Transitions/Spin DVD/Spin DVD-.mov;
(4) The asset matte movie, if present, has the same name as the transition followed by "-matte" and an optional suffix (e.g., ABC-matte.mov). For example, /Transitions/ Spin DVD/Spin DVD-matte.mov;
(5) The background matte movie, if present, has the same name as the transition followed by "-background Matte" and an optional suffix (e.g., ABC-backgroundMatte-.mov). For example, /Transitions/Spin DVD/Spin DVD-backgroundMatte.mov; and
(6) The switch point, duration and other parameters, if present, may be found in a parameter file or a key. For example, /Transitions/Spin DVD/Spin DVD-key.

In the above file structure and naming convention, the name of the subdirectory is used to identify the particular transition and all the assets relevant to that transition. A suffix in the file name is used to identify the file's purpose. Of course, this is only a design choice. Other naming conventions may work in the same way.

Embodiments of the invention may be implemented as an add-on to an existing video editing application. Suitable video editing applications include, but are not limited to the following commercial products: DVD Studio Pro; iMovie; and Final Cut (all available from Apple Computer, Inc. of Cupertino, Calif., assignee of the current patent).

In operation, a video editing application in accordance with the invention is launched to make a new movie, including combining two video clips and inserting a transition between them. The user then locates the transition folder with the correct assets somewhere in his computer system. Alternatively, he may create a new transition folder, saving a copy of each required asset into the newly created folder—following the adopted naming convention. Once he saves all the necessary assets in the transition folder, the folder with all its content becomes an x-asset key for that transition.

When triggered (commanded) to generate the desired transition, the application will scan for folders and various assets within the folder, such as an asset movie with alpha channels and/or markers, an asset matte movie and a background matte movie. The application may also scan for other parameters, such as duration and/or switch point, if any. If more information than necessary is present in the folder, the application will decide which to use in accordance with a predefined (albeit arbitrary) priority sequence. For example, regarding the issue of which image (start or end) to show, the priority is background matte movie, switch point, marker in asset movie, and the default mid-point, from high to low. Regarding the issue of transition duration, the priority is duration parameter, asset movie, asset matte movie and background matte movie.

Once all assets are identified, the application can compile transition metadata from the identified assets. Such metadata is used by the application, or a composite utility within the application, to actually render the transition effect. The metadata may be in any form such as, for example, an ASCII file, an array or a dictionary. In the example above, a dictionary may be used to compile the metadata.

Using the compiled metadata, the application can generate the transition, which is the combination of the start frame, the end frame and the asset movie, affected by the asset matte movie, background matte movie and/or other parameters. The user can view the resulting transition in the application. He may also save/export the transition for use in other programs. The identified transition assets may be used for generating a transition for other multimedia objects such as video clips or the like.

Continuing the alpha transition example begun above, the transition movie is then sandwiched between the first video clip (the start image) and the second video clip (the end image) to make a complete movie. Thus, the completed movie has a first video clip, a customized transition and a second video clip.

In another embodiment, the designated transition may be a displacement map transition. As the user can define his own displacement map, the number of possible transitions is endless. More specifically, a user can provide a displacement map and, if desired, an associated alpha matte in the form of grayscale movies. Displacement transitions also allow for additional parameters like scale, directional movement and acceleration parameters as well as camera and light settings. In this case, the displacement map (similar to the asset movie) is used to change or transform the original movie. The original movie is the background movie, the displacement map is the foreground movie and the embedded alpha channel or the separate grayscale movie is the alpha channel. Through the displacement transition, the original movie becomes a transformed movie.

In yet another embodiment of the invention, the user may define many different transformations, including distortions, special effects and filters using the same movies as input materials. For example, a user may specify scaling on the z-axis, stretching on the x and y-axis (zoom) and illuminating a part of frames and other pixel transformations on an image or movie. The user may provide the asset movies for each of these transformations. Further, various types of transformations may be combined.

For illustrative purposes, the various assets for a displacement transition or a more generic transformation may be identified using the key-value naming convention introduced in Table 1 above as follows:

TransitionAsset—MyTransition.mov
TransitionAssetMatte—MyTransition-matte.mov
ScaleDisplacementAsset—MyTransition-scaleMap.mov
HorizontalZoomDisplacementAsset—MyTransition-zoomXMap.mov
VerticalZoomDisplacementAsset—MyTransition-zoomYMap.mov
LuminosityDisplacementAsset—MyTransition-luminosityMap.mov
DisplacementMatte MyTransition—displacementMatte.mov Various changes in the details of the illustrated operational methods are possible without departing from the scope of the following claims. For instance, the act of identifying transition assets (e.g., see FIG. 1) may include storing assets associated with a transition in a predefined location (e.g., the transition asset folder), or it may include specifying the location of each asset required (e.g., by specifying the directory path to the target asset). In addition, acts in accordance with FIGS. 1 and 2 may be performed by a programmable control device executing instructions organized into one or more program modules (e.g., a video editing application). A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

What is claimed is:

1. A method to specify a multimedia transition, comprising:
    identifying with a computer system executing a video editing application a source multimedia object;
    identifying with the computer system a target multimedia object;
    defining, by a user with the video editing application, an x-asset key that includes one or more parameter values and a plurality of multimedia assets including at least one multimedia asset being user-supplied and being generated independent of: any predefined multimedia assets provided by the video editing application, the source multimedia object, and the target multimedia object;
    selecting, in the video editing application, at least one of the one or more parameter values and at least two of the plurality of multimedia assets from the user-defined x-asset key to define a transition; and
    compositing the transition with the source and target multimedia objects to generate a result multimedia object
    wherein, at least two of the one or more parameter values and the plurality of multimedia assets are stored in different locations in the computer system and wherein the video editing application stores the user-defined x-asset key for subsequent use.

2. The method of claim 1, wherein the act of identifying a plurality of multimedia assets comprises identifying one or more of an asset movie, an asset matte movie and a background matte movie.

3. The method of claim 1, wherein the at least one user-supplied multimedia asset comprises a user-generated multimedia asset.

4. The method of claim 3, wherein the user-generated multimedia asset comprises a video clip.

5. The method of claim 3, wherein the user-generated multimedia asset comprises a user-generated matte video clip.

6. The method of claim 1, wherein the act of compositing comprises determining a transition time associated with the transition.

7. The method of claim 6, wherein the act of determining a transition time comprises querying the user for a transition time.

8. The method of claim 6, wherein the act of determining a transition time comprises interrogating a user-supplied multimedia asset to determine the transition time.

9. The method of claim 8, wherein the act of determining a transition time comprises:
    identifying a key asset from among the plurality of multimedia assets; and
    interrogating metadata associated with the key asset to identify a default transition time.

10. The method of claim 9, further comprising modifying the default transition time to a value selected by a user.

11. The method of claim 1, wherein the act of identifying a source multimedia object comprises identifying a first location in a first multimedia presentation.

12. The method of claim 11, wherein the act of identifying a target multimedia object comprises identifying a second location in the first multimedia presentation.

13. The method of claim 11, wherein the act of identifying a target multimedia object comprises identifying a first location in a second multimedia presentation.

14. A non-transitory program storage device encoding machine readable instructions of a video editing application for causing a programmable control device to:
    identify a source multimedia object;
    identify a target multimedia object;
    define, by a user with the video editing application, an x-asset key that includes one or more parameter values and a plurality of multimedia assets including at least one multimedia asset being user-supplied and being generated independent of: any predefined multimedia assets provided by the video editing application, the source multimedia object, and the target multimedia object;
    select, in the video editing application, at least one of the one or more parameter values and at least two of the plurality of multimedia assets from the user-defined x-asset key to define a transition; and composite the transition with the source and target multimedia objects to generate a result multimedia object wherein, at least two of the one or more parameter values and the plurality of multimedia assets are stored in different locations in the computer system and wherein the video editing application stores the user-defined x-asset key for subsequent use.

15. The program storage device of claim 14, wherein the instructions to cause the programmable control device to identify a plurality of multimedia assets comprise instructions to cause the programmable control device to identify user-generated multimedia assets.

16. The program storage device of claim 14, wherein the instructions to cause the programmable control device to identify a plurality of multimedia assets comprise instructions to cause the programmable control device to identify user-supplied video clips.

17. The program storage device of claim 14, further comprising instructions to cause the programmable control device to determine a transition time associated with the transition.

18. The program storage device of claim 17, wherein the instructions to cause the programmable control device to determine a transition time comprise instructions to cause the programmable control device to automatically determine a transition time from a user-supplied multimedia asset.

19. The program storage device of claim 14, wherein the instructions to cause the programmable control device to identify a source multimedia object comprise instructions to cause the programmable control device to identify a first location in a first multimedia presentation.

20. The program storage device of claim 19, wherein the instructions to cause the programmable control device to identify a target multimedia object comprise instructions to cause the programmable control device to identify a second location in the first multimedia presentation.

21. The program storage device of claim 19, wherein the instructions to cause the programmable control device to identify a target multimedia object comprise instructions to cause the programmable control device to identify a first location in a second multimedia presentation.

22. A non-transitory program storage device, readable by a programmable control device and comprising instructions stored thereon to cause the programmable control device to:

identifying a source multimedia object with a video editing application executing on a computer system;

identifying a target multimedia object with the video editing application;

defining, by a user with the video editing application, an x-asset key that includes one or more parameter values and a plurality of multimedia assets, wherein at least one of the plurality of multimedia assets is user-supplied and is independent of the source multimedia object, the target multimedia object and the video editing application;

selecting, in the video editing application, at least one of the one or more parameter values and at least two of the plurality of multimedia assets from the user-defined x-asset key to define a transition; and compositing the source multimedia object, the transition and the target multimedia object to generate a result multimedia object, wherein, at least two of the one or more parameter values and the plurality of multimedia assets are stored in different locations in the computer system and wherein the video editing application stores the user-defined x-asset key for subsequent use.

\* \* \* \* \*